(12) United States Patent
Suh

(10) Patent No.: US 8,850,638 B1
(45) Date of Patent: Oct. 7, 2014

(54) MODULAR FOLDING BED FRAME SET

(71) Applicant: Bernard Suh, Ambler, PA (US)

(72) Inventor: Bernard Suh, Ambler, PA (US)

(73) Assignee: Pragma Corporation, Colmar, PA (US)

( * ) Notice: Subject to any disclaimer, the term of this patent is extended or adjusted under 35 U.S.C. 154(b) by 0 days.

(21) Appl. No.: 13/919,801

(22) Filed: Jun. 17, 2013

(51) Int. Cl.
*A47C 19/12* (2006.01)
*A47C 19/02* (2006.01)

(52) U.S. Cl.
CPC ..................................... *A47C 19/12* (2013.01)
USPC ............. 5/201; 5/296; 5/176.1; 5/179; 5/311; 5/286

(58) Field of Classification Search
USPC ........... 5/53.1, 93.2, 132, 174–180, 183, 184, 5/201, 280, 282.1, 285, 286, 296, 301, 5/311
See application file for complete search history.

(56) References Cited

U.S. PATENT DOCUMENTS

| | | | | |
|---|---|---|---|---|
| 825,467 | A * | 7/1906 | Keightley et al. | 5/183 |
| 867,820 | A * | 10/1907 | Hamilton | 5/183 |
| 1,270,358 | A * | 6/1918 | Zaremba | 5/176.1 |
| 1,860,103 | A * | 5/1932 | Frank | 5/11 |
| 4,068,332 | A * | 1/1978 | Ball et al. | 5/296 |
| 4,225,265 | A | 9/1980 | Bishop et al. | |
| 4,617,689 | A | 10/1986 | Gloger et al. | |
| 4,856,127 | A * | 8/1989 | Lenger | 5/53.1 |
| 5,438,723 | A | 8/1995 | Carroll | |
| 5,740,568 | A | 4/1998 | Elliott | |
| 5,790,994 | A * | 8/1998 | Leonard | 5/53.1 |
| 6,990,698 | B2 | 1/2006 | Wall, Sr. | |
| 7,376,986 | B2 * | 5/2008 | Smith et al. | 5/9.1 |
| 7,681,259 | B2 * | 3/2010 | Jin | 5/53.1 |
| 7,712,162 | B2 * | 5/2010 | Shamie et al. | 5/2.1 |
| 7,784,122 | B2 * | 8/2010 | Oh | 5/201 |
| 7,950,337 | B2 | 5/2011 | Chen | |
| 2009/0113626 | A1 * | 5/2009 | Harrow | 5/132 |

OTHER PUBLICATIONS

Website: http://www.youtube.com/watch?v=HVktVICIHHc "Slat Base".

* cited by examiner

*Primary Examiner* — Michael Trettel
(74) *Attorney, Agent, or Firm* — John H. Choi

(57) ABSTRACT

A modular paneled bed frame assembled from connected paneled sections. A modular paneled bed frame may be comprised generally of a headboard, a footboard, and side rails. Modular paneled bed frame may be configured in a folded position for ease of shipping or retail storage. In an embodiment, a modular paneled bed frame may be assembled by an end consumer in a short period of time, for example less than 15 minutes, based on a "no-tool" assembly due to hinged and interlocking components.

14 Claims, 10 Drawing Sheets

MODULAR FOLDING BED FRAME SET

FIELD

The present disclosure relates to the field of bed frames, in particular, a modular paneled bed frame assembled from interconnected paneled sections.

SUMMARY

An object of the present disclosure is a modular bed frame comprising a headboard, the headboard being comprised of at least two panels connected by at least one hinge, wherein the two panels are adapted to be selectively locked by a locking member; a footboard, the footboard being comprised of at least two panels connected by at least one hinge, wherein the two panels are adapted to be selectively locked by a locking member; and, at least two side rails, the at least two side rails being adapted to be selectively coupled to the headboard and the footboard, wherein the side rails are selectively coupled to the headboard and the footboard by selective attachment points fixed to the side rails and to the headboard and footboard.

Another object of the present disclosure is a modular bed frame comprising a headboard, the headboard being comprised of a first section and a second section and a hook plate, the first section having at least one hook and the second section having at least one hook aperture, the first section and second section being selectively coupled by mating the at least one hook and the at least one hook aperture; a footboard, the footboard being comprised of a first section and a second section and a hook plate, the first section having at least one hook and the second section having at least one hook aperture, the first section and second section being selectively coupled by mating the at least one hook and the at least one hook aperture; and, at least two side rails, the at least two side rails having a frame hook at a first end and a second end, the at least two side rails being selectively coupled to the headboard and the footboard wherein the frame hook is engaged with the side rail hook plate.

Another object of the present disclosure is a modular bed frame assembly comprising at least two headboard panel frames, the at least two headboard panel frames having at least one panel hinge, at least one rotatable lock bar, and a side board connection aperture; at least two footboard panel frames, the at least two footboard panel frames having at least one panel hinge, at least one rotatable lock bar, and a side board connection aperture; and, at least two side rail panel frames, the at least two side rail panel frames having at least one panel hinge, at least one rotatable lock bar, and at least one frame hook at a distal end.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

Figure 1:
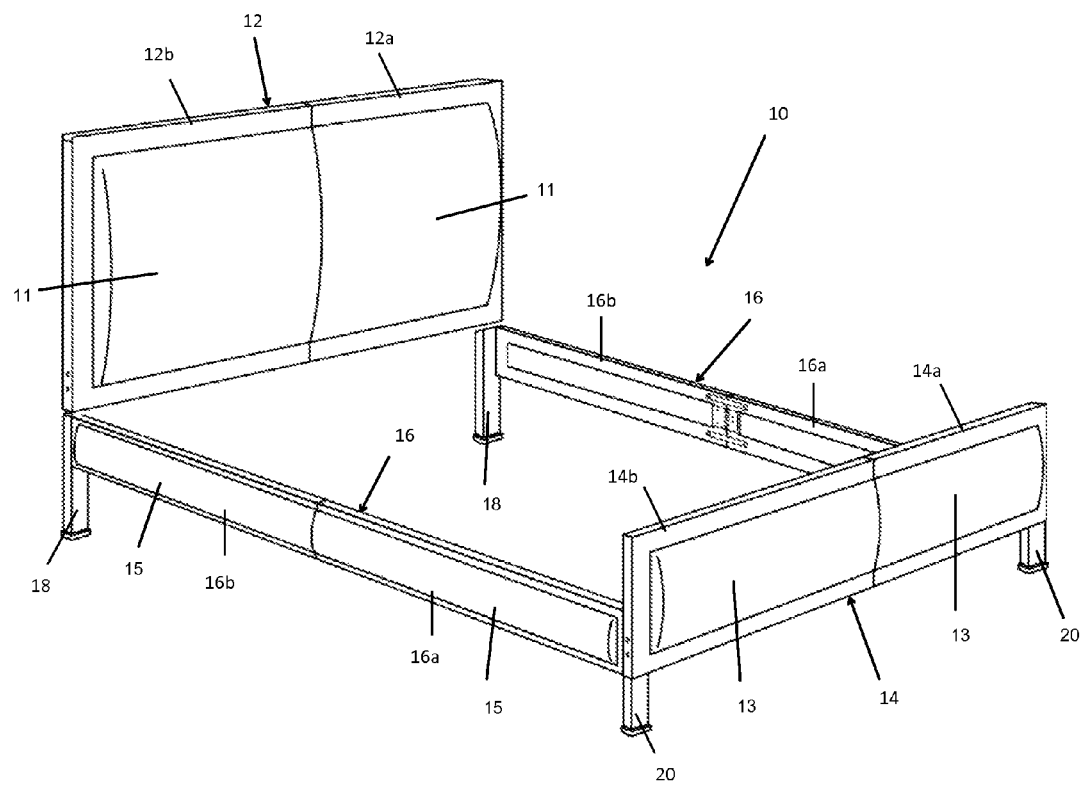
FIG. 1 is a perspective view of an embodiment of a modular paneled bed frame.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Referring to the drawings in detail, FIG. 1 is a perspective view of an embodiment of a modular paneled bed frame. A modular paneled bed frame 10 is comprised generally of a headboard 12, a footboard 14, and side rails 16. Modular paneled bed frame 10 may be configured in a folded position for ease of shipping or retail storage. In an embodiment, modular paneled bed frame 10 may be assembled by an end consumer in a short period of time, for example less than 15 minutes, based on a "no-tool" assembly due to hinged and interlocking components.

Headboard 12 may consist of a two piece assembly comprised of a first headboard panel frame 12a and a second headboard panel frame 12b. In an embodiment, these frames correspond to right and left sections, although it is anticipated that some embodiments may have interchangeable sections; it is further anticipated that headboard 12 may be made of more than two interconnected frame panels. Headboard 12 may have retractable legs 18, or may have fixed or integral legs or supports. In an embodiment, first and second headboard panel frames 12a and 12b have a retractable leg 18 on an opposite side of the frame in relation to each other. Headboard 12 may have a headboard panel cover 11 that is press fit, snapped, or otherwise mechanically engaged by male and female mating components or corresponding protrusions and apertures to a substantial portion of the perimeter of headboard 12. Headboard panel cover 11 may be decorative, and in an embodiment may be manufactured from a hot pressed wood back with a foam overlay, and a fabric cover stretched over the foam and secured to a rear portion of the hot pressed wood back. Alternative designs and manufacture techniques are anticipated.

Footboard 14 may consist of a two piece assembly comprised of a first footboard panel frame 14a and a second footboard panel frame 14b. In an embodiment, these frames correspond to right and left sections, although it is anticipated that some embodiments may have interchangeable sections; it is further anticipated that footboard 12 may be made of more than two interconnected frame panels. Footboard 14 may have retractable legs 20, or may have fixed or integral legs or supports. In an embodiment, first and second footboard panel frames 14a and 14b have a retractable leg 20 on an opposite side of their frame in relation to each other. Footboard 14 may have a footboard panel cover 13 that may be selectively attached to footboard 14 in substantially the same manner as that of headboard panel cover 11 and headboard 12. Footboard panel cover 13 may be of substantially the same manufacture as that of headboard panel cover 11.

Side rails 16 may consist of a two piece assembly comprised of a first side rail panel frame 16a and a second side rail panel frame 16b. Side rail panel frames 16a and 16b may connect to each other at a proximal portion and may interface and connect with footboard 14 and headboard 12 at a distal portion. It is anticipated that side rail panel frames 16a and 16b may be comprised of more than a two piece assembly, or conversely a single rail assembly. Side rail 16 may have a side rail panel cover 15 that may be selectively attached to side rail 16 in substantially the same manner as that of headboard panel cover 11 and headboard 12. Side rail panel cover 16 may be of substantially the same manufacture as that of headboard panel cover 11.

Figure 2A:
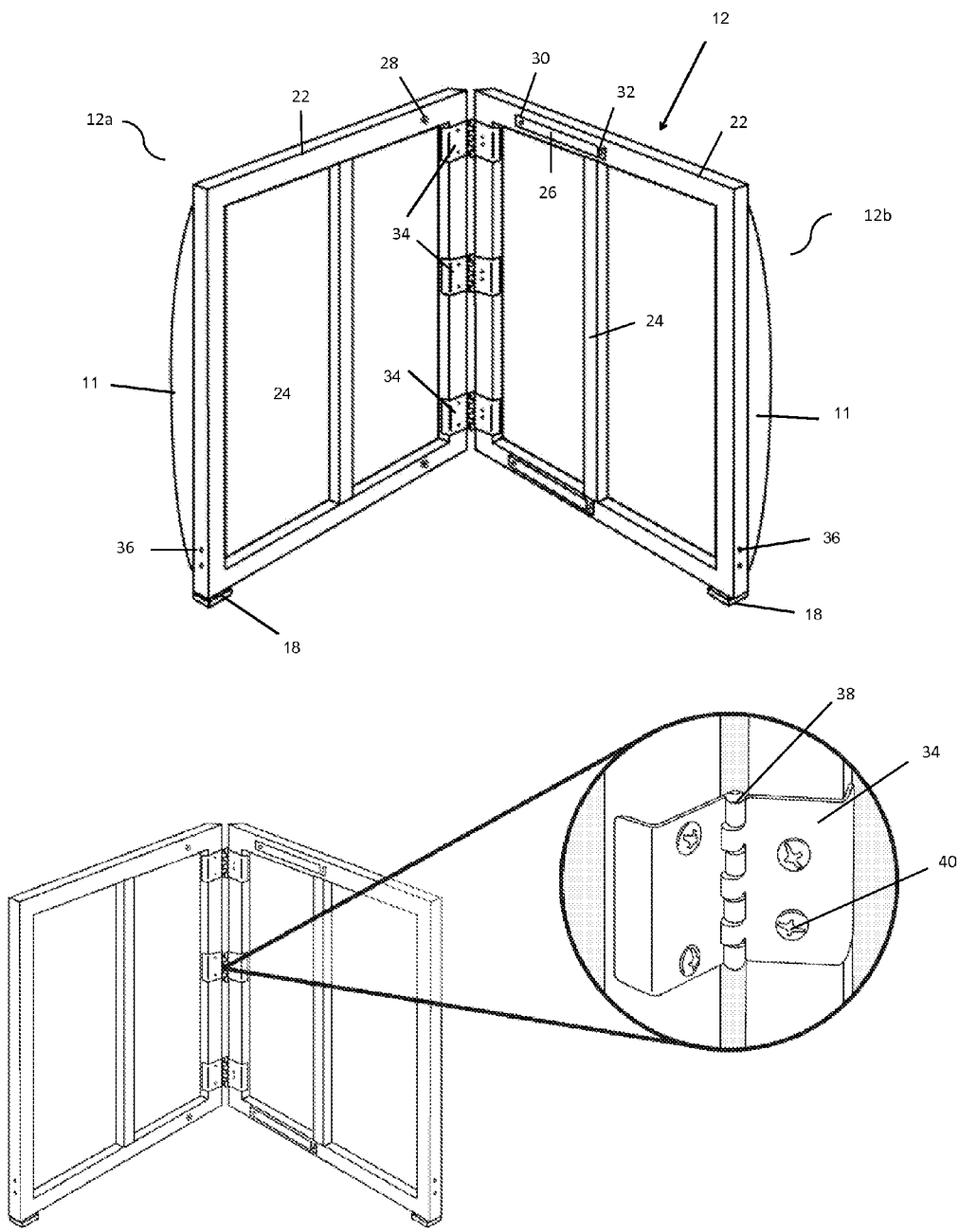
FIG. 2a is a perspective view of an embodiment of a modular headboard in a partially folded position and a perspective view of a hinge of the modular headboard.

FIG. 2a is a perspective view of an embodiment of a modular headboard 12 in a partially folded position. First headboard panel frame 12a and second headboard panel frame 12b may be comprised of a perimeter frame 22 and a frame support 24. Perimeter frame 22 may have a leg connection aperture 36 for securing a support leg. First headboard panel frame 12a and second headboard panel frame 12b may be manufactured from wood, powder-coated steel, metal alloy, plastic, polyvinyl chloride and the like. Panel frames 12a and 12b may be connected at proximal perimeters by a panel frame hinge 34, thereby forming a midpoint for headboard 12 to fold substantially in half. Panel frame hinge 34 may be coupled to the headboard panel frames by a hinge screw 40. Headboard panels may fold around an axis of hinge pin 38 to enable storage or packaging of headboard 12 in a smaller area relative to an extended position. In an embodiment, a panel frame has a rotating support bar 26, and an opposite frame has a locking support bolt 28. Rotating support bar 26 may rotate around an axis of rotating support bolt 30, and may interface with locking support bolt 28 through engagement with a support bar aperture 32.

Figure 2B:
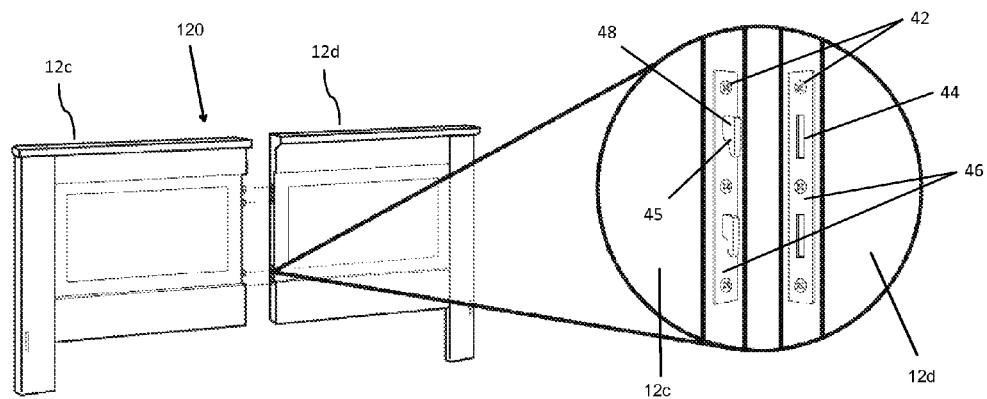
FIG. 2b is a perspective view of another embodiment of a modular headboard in a detached position and a perspective view of an embodiment of a locking mechanism the modular headboard.

FIG. 2b is a perspective view of an embodiment of a modular headboard 120 in an unassembled position. In this embodiment, first headboard panel 12c and second headboard panel 12d may be substantially solid panels. First headboard panel 12c and second headboard panel 12d may connect to form headboard panel 12 by engagement of a frame hook 48 and a frame hook aperture 44. Frame hook 48 may be integrally connected to a frame hook plate 46 and screwed, or otherwise coupled, to a perimeter portion of a first headboard panel 12c. Frame hook plate 46 may be screwed to second headboard panel 12d with frame hook screw 42 in substantial alignment with a frame hook aperture 44. Frame hook 48 may be inserted into a corresponding frame hook aperture 44. A base portion 45 of frame hook 48 rests on frame hook plate 46 such that first headboard panel 12c and second headboard panel 12d are mechanically engaged in an assembled position.

Figure 3:
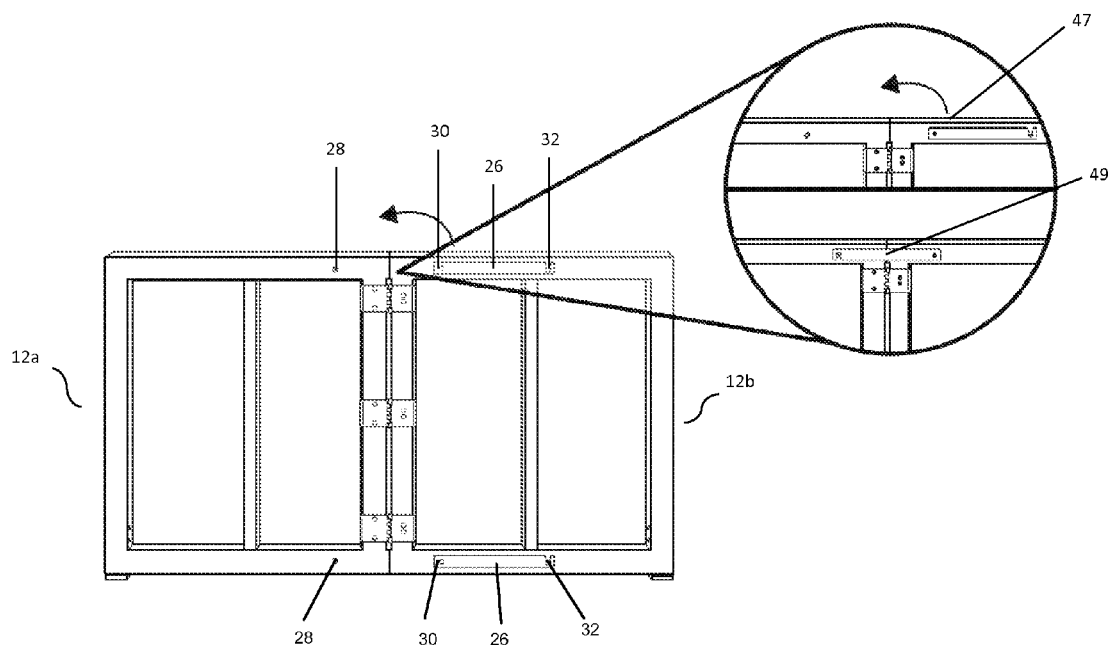
FIG. 3 is a perspective view of the modular headboard shown in FIG. 2a and an illustration of the locking mechanism shown therein in disengaged and engaged states.

FIG. 3 is a perspective view of an embodiment of a locking mechanism (also shown in FIG. 2a) as engaged in a modular headboard in an extended position. In an embodiment, a panel frame 12b has a rotating support bar 26, and an opposite frame 12a has a locking support bolt 28. Rotating support bar 26 may rotate around an axis of rotating support bolt 30, and may interface with locking support bolt 28 through engagement with a support bar aperture 32. Rotating support bar 26 may rotate from a disengaged position 47 to an engaged position 49. Engaged position 49 may provide stability for frame hinge 34 and lock panels 12a and 12b in an extended position to comprise headboard 12.

Figure 4:
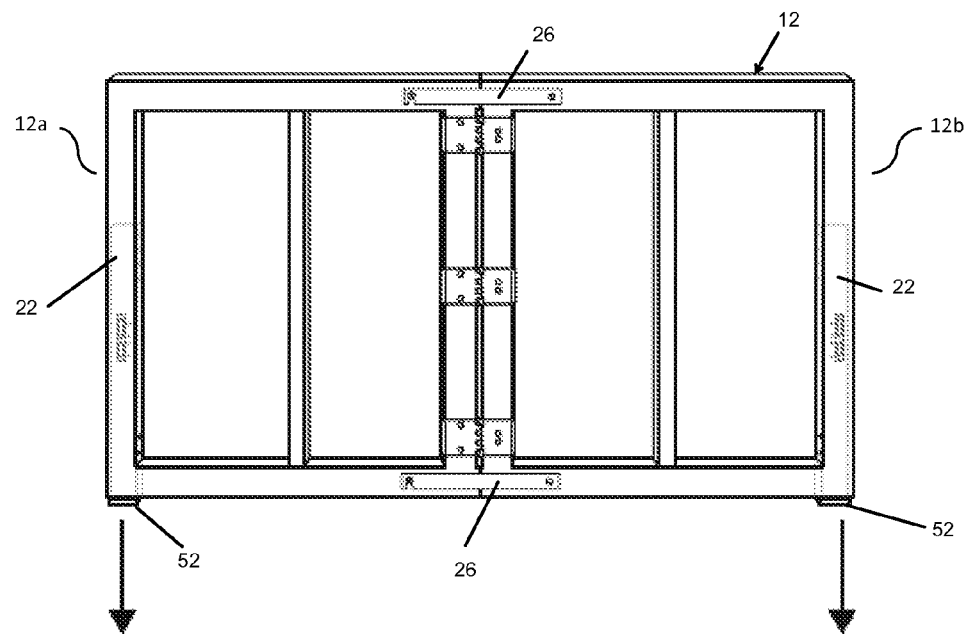
FIG. 4 is a perspective view of the modular headboard of FIG. 2a showing the support legs in retracted and extended states.
Figure 4:
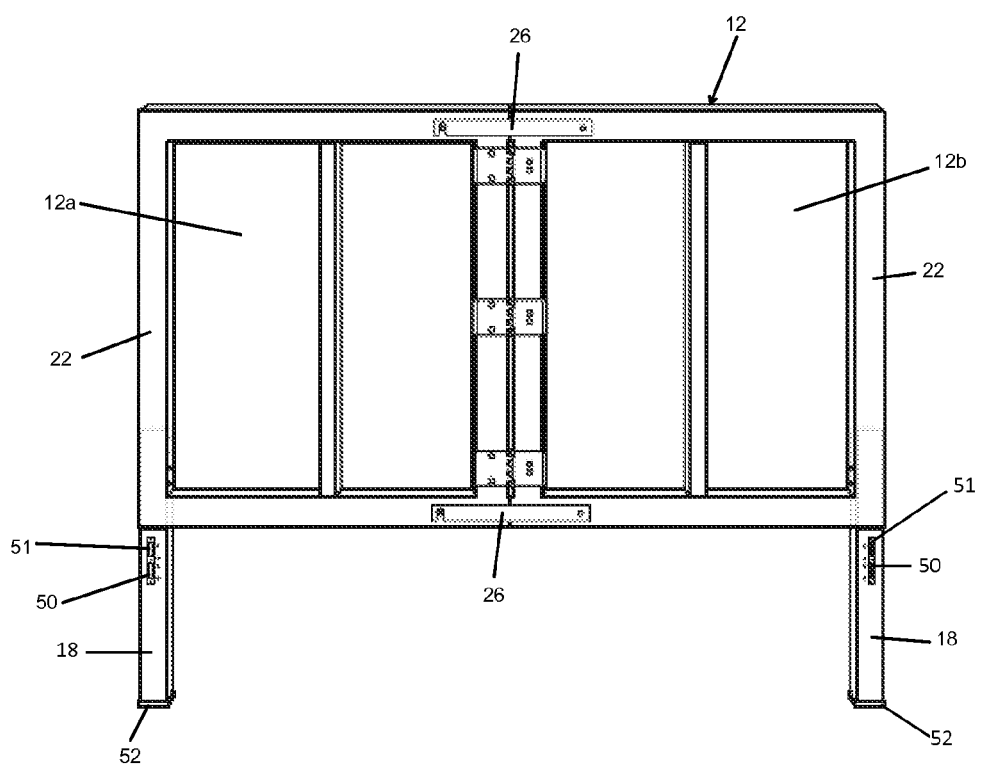
Figure 5:
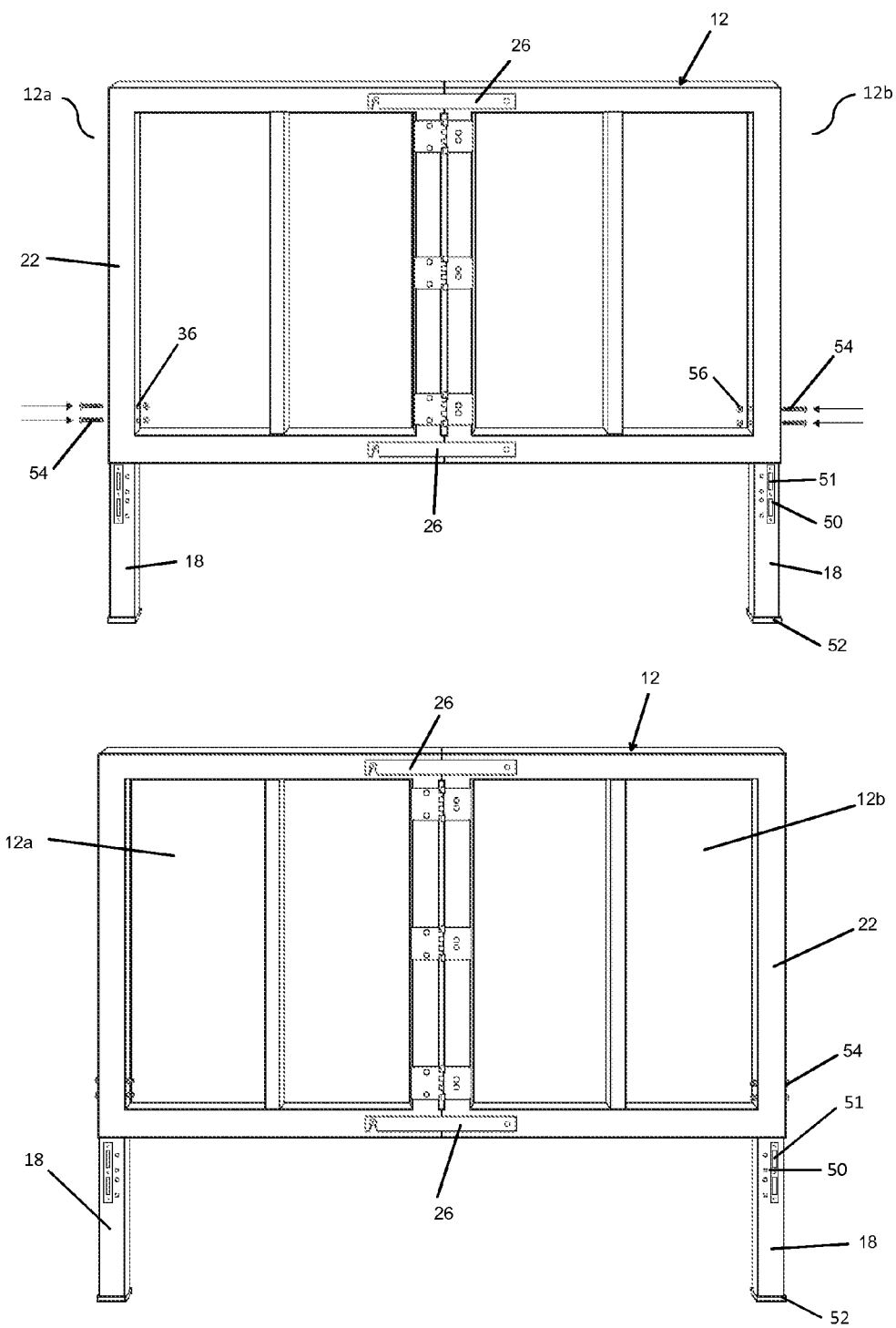
FIG. 5 is a perspective view of the modular headboard of FIG. 2a showing the extended support legs in unlocked and locked states.

FIG. 4 are perspective views of an embodiment of extending support legs for a modular headboard. In an embodiment, support leg 18 may be retractably housed in an interior portion of perimeter frame 22 of a first headboard panel frame 12a and a second headboard panel frame 12b. An end cap 52 may be coupled to an end portion of support leg 18, such that support leg 18 can be slidably engaged from the interior portion of perimeter frame 22 by sliding end cap 52. Support leg 18 may be further comprised of a side rail hook plate 50, which may include a hook aperture 51 for mechanical engagement with a side rail hook. FIG. 5 are perspective views of an embodiment of a modular headboard with extending support legs in a fixed position. In an embodiment, support leg 18 is fixed with a headboard leg bolt 54. Headboard leg bolt 54 is threaded through headboard leg aperture 36 and secured with a headboard leg nut 56.

Figure 6A:
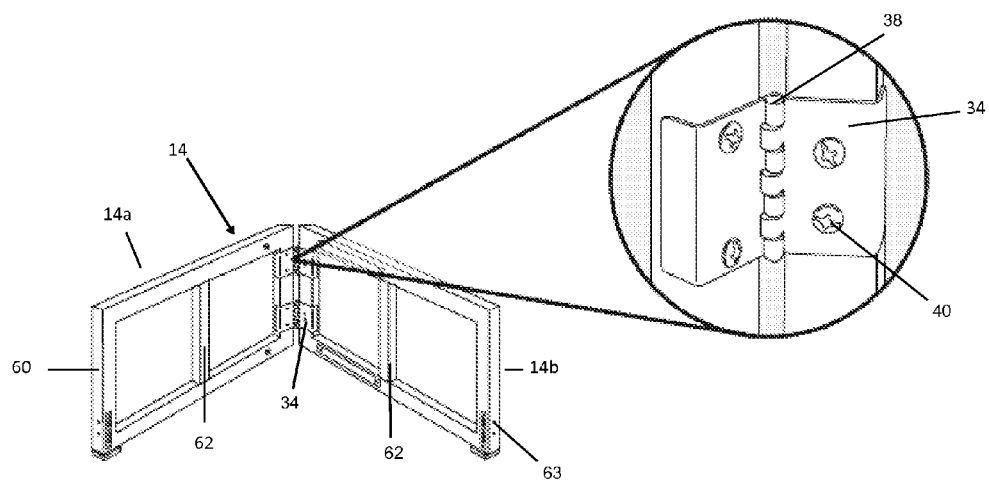
FIG. 6a is a perspective view of an embodiment of a modular paneled footboard in a partially folded position and a perspective view of a hinge of the footboard.

FIG. 6a is a perspective view of an embodiment of a modular paneled footboard in a partially folded position. First footboard panel frame 14a and second footboard panel frame 14b may be comprised of a perimeter frame 60 and a frame support 62. Perimeter frame 22 may have a leg connection aperture 63 for securing a support leg. First footboard panel frame 14a and second footboard panel frame 14b may be manufactured from wood, powder-coated steel, metal alloy, plastic, polyvinyl chloride and the like. Panel frames 14a and 14b may be connected at proximal perimeters by a panel frame hinge 34, thereby forming a midpoint for footboard 14 to fold substantially in half. Panel frame hinge 34 may be coupled to the footboard panel frames by a hinge screw 40. Footboard panels may fold around an axis of hinge pin 38 to enable storage or packaging of footboard 14 in a smaller area relative to an extended position.

Figure 6B:
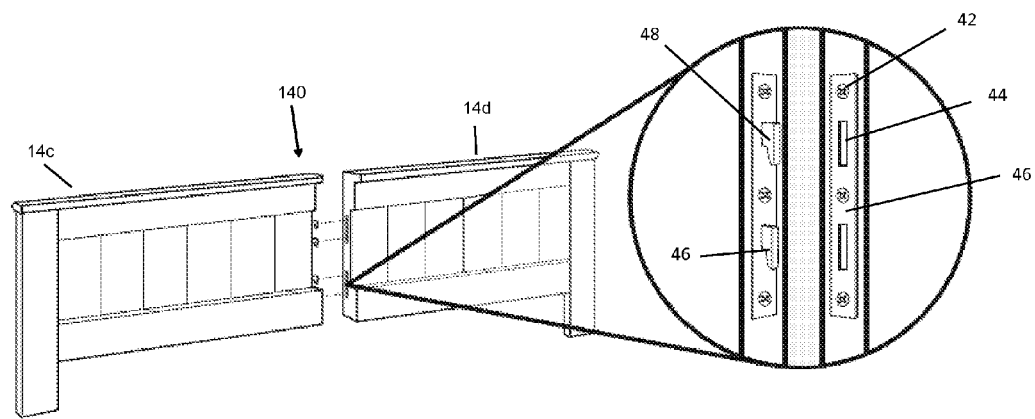
FIG. 6b is a perspective view of another embodiment of a modular footboard in an detached position and an perspective view of a locking mechanism of the footboard.

FIG. 6b is a perspective view of another embodiment of a modular footboard 140 in an unassembled position. In this embodiment, first footboard panel 14c and second footboard panel 14d may be substantially solid panels. First footboard panel 14c and second footboard panel 14d may connect to form footboard panel 14 by engagement of a frame hook 48 and a frame hook aperture 44. Frame hook 48 may be integrally connected to a frame hook plate 46 and screwed to a perimeter portion of a first footboard panel 14c. Frame hook plate 46 may be screwed to second footboard panel 14d with frame hook screw 42 in substantial alignment with a frame hook aperture 44. Frame hook 48 may be inserted into a corresponding frame hook aperture 44. A base portion 45 of frame hook 48 rests on frame hook plate 46 such that first footboard panel 14c and second footboard panel 14d are mechanically engaged in an assembled position.

Figure 7A:
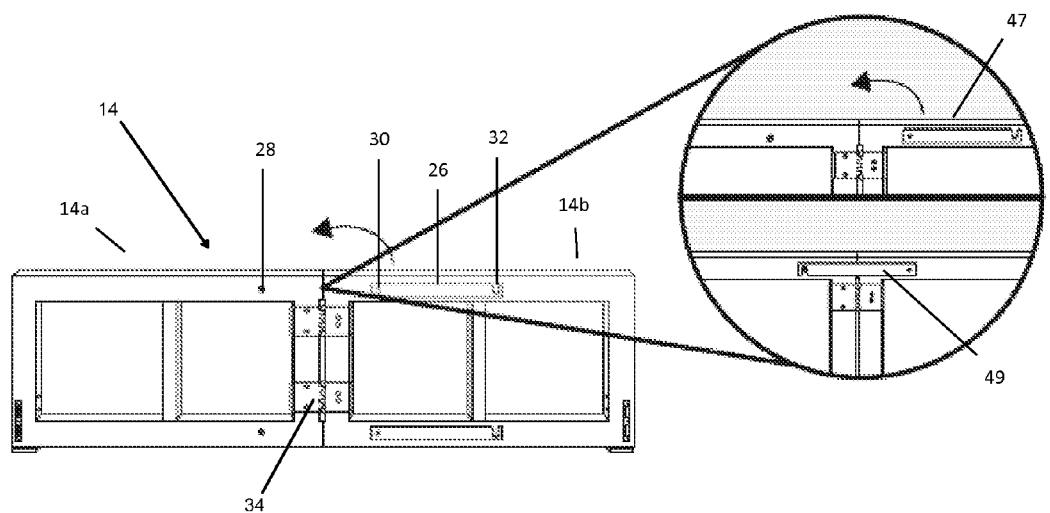
FIG. 7a is a perspective view of the footboard shown in FIG. 6a and an illustration of the locking mechanism shown therein in disengaged and engaged states.

FIG. 7a is a perspective view of an embodiment of a locking mechanism (also shown in FIG. 6a) as engaged in a modular footboard. In an embodiment, a panel frame 14b has a rotating support bar 26, and an opposite frame 14a has a locking support bolt 28. Rotating support bar 26 may rotate around an axis of rotating support bolt 30, and may interface with locking support bolt 28 through engagement with a support bar aperture 32. Rotating support bar 26 may rotate from a disengaged position 47 to an engaged position 49. Engaged position 49 may provide stability for frame hinge 34 and lock panels 14a and 14b in an extended position to comprise footboard 14.

Figure 7B:
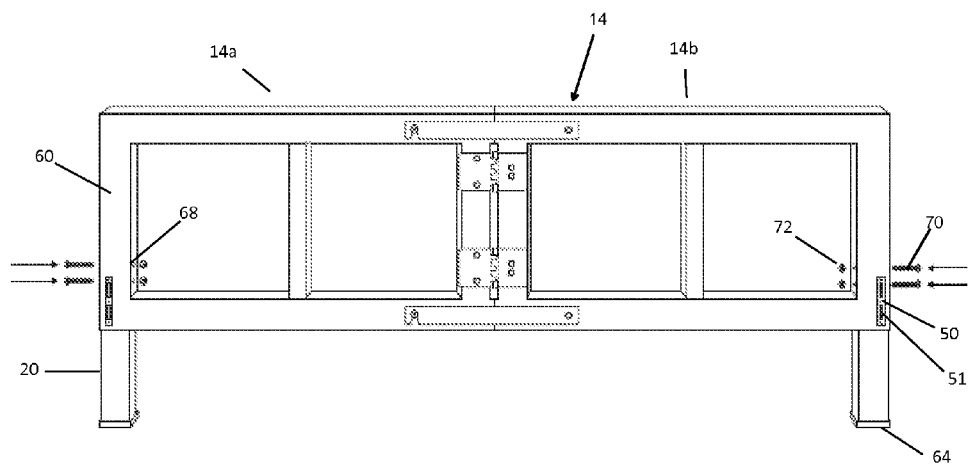
FIG. 7b is a perspective view of the footboard shown in FIG. 7a with the locking mechanism engaged and the support legs extended.

FIG. 7b is a perspective view of an embodiment of extending support legs for a modular footboard. In an embodiment, footboard support leg 20 may be retractably housed in an interior portion of perimeter frame 60 of a first footboard panel frame 14a and a second footboard panel frame 14b. An end cap 64 may be coupled to an end portion of support leg 20, such that support leg 20 can be slidably engaged from the interior portion of perimeter frame 60 by pulling end cap 64. First footboard panel frame 14a and a second footboard panel frame 14b may be further comprised of a side rail hook plate 50, which may include a hook aperture 51 for mechanical engagement with a side rail hook. Support leg 20 is fixed with a footboard leg bolt 70. Footboard leg bolt 70 is threaded through footboard leg aperture 68 and secured with a footboard leg nut 72.

Figure 8A:
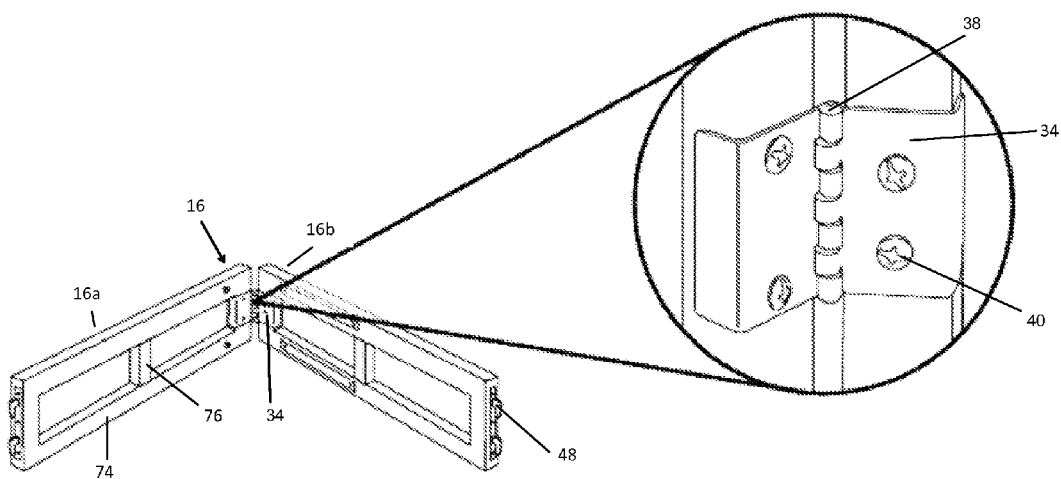
FIG. 8a is a perspective view of an embodiment of a modular side panel for a modular paneled bed frame in a partially folded position and a perspective view of a hinge portion of the side panel.

FIG. 8a is a perspective view of an embodiment of a modular paneled side rail 16 in a partially folded position. First side rail panel frame 16a and second side rail panel frame 16b may be comprised of a perimeter frame 74 and a frame support 76. Perimeter frame 74 may have a frame hook 48 for mechanical engagement with a side rail hook plate on a modular headboard 12 and/or a modular footboard 14. First side rail panel frame 16a and second side rail panel frame 16b may be manufactured from wood, powder-coated steel, metal alloy, plastic, polyvinyl chloride and the like. Side rail frames 16a and 16b may be connected at proximal perimeters by a panel frame hinge 34, thereby forming a midpoint for side rail 16 to fold substantially in half. Panel frame hinge 34 may be coupled to the side rail panel frames by a hinge screw 40. Side rail panels may fold around an axis of hinge pin 38 to enable storage or packaging of side rail 16 in a smaller area relative to an extended position.

Figure 8B:
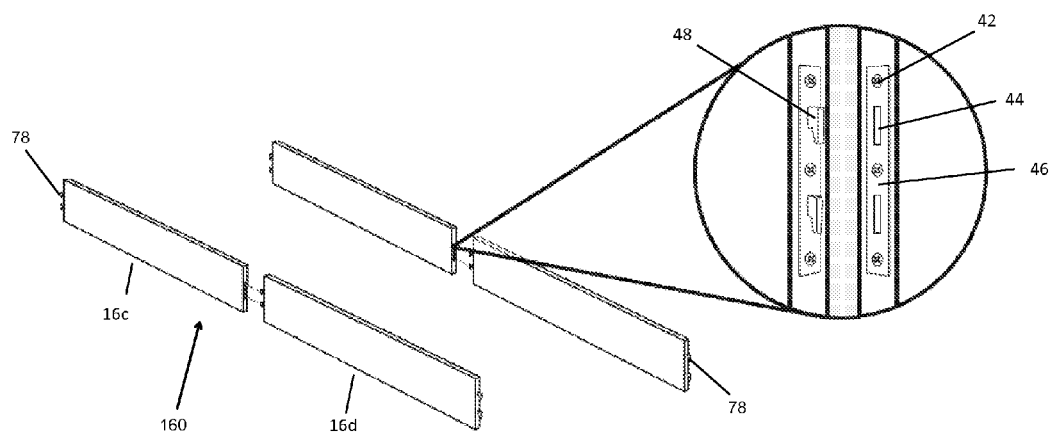
FIG. 8b is a perspective view of another embodiment of a modular side panel for a modular paneled bed frame in a disengaged position and a perspective view of an embodiment of a locking mechanism of the side panel.

FIG. 8b is a perspective view of another embodiment of a modular side rail 160 in an unassembled position. In this embodiment, first side rail panel 16c and second side rail panel 16d may be substantially solid panels. First side rail panel 16c and second side rail panel 16d may connect to form side rail panel 16 by engagement of a frame hook 48 and a frame hook aperture 44. Frame hook 48 may be integrally connected to a frame hook plate 46 and coupled to a perimeter portion of a first footboard panel 14c. Frame hook plate 46 may be coupled to second side rail panel 14d with frame hook screw 42 in substantial alignment with a frame hook aperture 44. Frame hook 48 may be inserted into a corresponding frame hook aperture 44. A base portion 45 of frame hook 48 rest on frame hook plate 46 such that first side rail panel 16c and second side rail panel 16d are mechanically engaged in an assembled position. First side rail panel 16c and second side rail panel 16d may have a side rail hook 78 for mechanical engagement with a side rail hook plate on a modular headboard 12 and/or a modular footboard 14.

Figure 9:
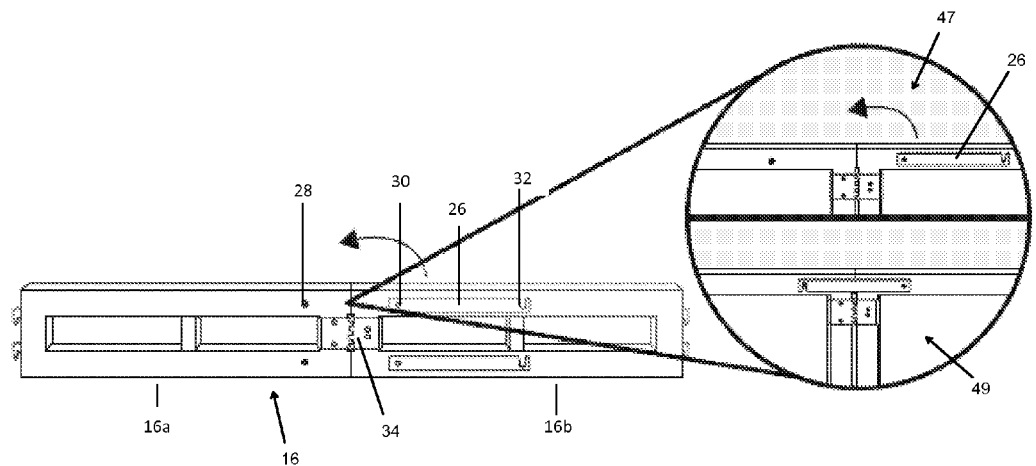
FIG. 9 is a perspective view of the side panel of FIG. 8a and an illustration of the locking mechanism shown therein in disengaged and engaged states.

FIG. 9 is a perspective view of an embodiment of a locking mechanism as engaged in a modular side rail. In an embodiment, a side rail frame has a rotating support bar 26, and an opposite side rail frame has a locking support bolt 28. Rotating support bar 26 may rotate around an axis of rotating support bolt 30, and may interface with locking support bolt 28 through engagement with a support bar aperture 32. Rotating support bar 26 may rotate from a disengaged position 47 to an engaged position 49. Engaged position 49 may provide stability for frame hinge 34 and lock panels 16a and 16b in an extended position to comprise side rail 16.

Figure 10:
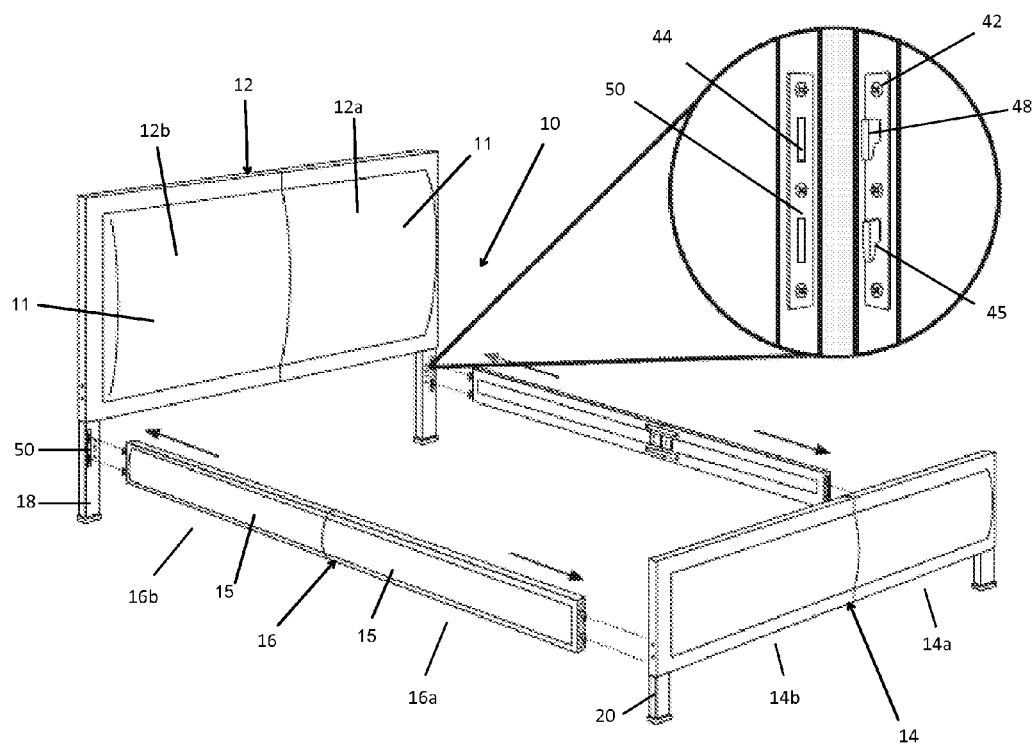
FIG. 10 is an exploded view of the modular paneled bed frame of FIG. 1.

FIG. 10 is an exploded view of the modular paneled bed frame 10 shown in FIG. 1. In this embodiment, modular headboard 12, footboard 14, and side rails 16 are engaged in an extended, locked position. Modular headboard 12, footboard 14, and side rails 16 interface with each other to form modular bed frame 10. Side rails 16 are mechanically engaged with a side rail hook plate 50 coupled to modular headboard 12 and footboard 14. Frame hook 48 may be inserted into a corresponding frame hook aperture 44. A base portion 45 of frame hook 48 may rest on side rail hook plate 50 for structural stability. Modular headboard 12, footboard 14, and side rails 16 may be matably engaged by the interface between frame hooks 48 and side rail hook plates 50. Modular bed frame 10 may be quickly assembled by engaging modular headboard 12, footboard 14, and side rails 16 in an extended, locked position, and inserting frame hooks 48 into frame hook apertures 44 on side rail hook plates 50. Modular bed frame 10 may be disassembled by removing frame hooks 48 from side rail hook plates 50, and unlocking and disengaging headboard panel frames 12a and 12b, footboard panel frames 14a and 14b, and side rail panel frame 16a and 16b. Headboard support legs 18 and footboard support legs may be extended in an engaged position, or retracted into headboard panel frames 12a and 12b and footboard panel frames 14a and 14b in a disengaged position.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A modular bed frame comprising:
   a headboard, the headboard being comprised of at least two panels connected by at least one hinge, wherein the two panels are adapted to be selectively locked by a locking member;
   a footboard, the footboard being comprised of at least two panels connected by at least one hinge, wherein the two panels are adapted to be selectively locked by a locking member; and
   at least two side rails, the at least two side rails being adapted to be selectively coupled to the headboard and the footboard, wherein the side rails are selectively coupled to the headboard and the footboard by selective attachment points fixed to the side rails and to the headboard and footboard;
   wherein the headboard further comprises retractable legs, the retractable legs being housed in an interior portion of the at least two panel frames and selectively engaged in a predetermined position.

2. The modular bed frame of claim 1, wherein the at least one retractable leg is fixed in the predetermined position according to connection apertures in the headboard and fixed with at least one bolt.

3. A modular bed frame comprising:
   a headboard, the headboard being comprises of at least two panels connected by at least one hinge, wherein the two panels are adapted to be selectively locked by a locking member;
   a footboard, the footboard being comprised of at least two panels connected by at least one hinge, wherein the two panels are adapted to be selectively locked by a locking member; and
   at least two side rails, the at least two side rails being adapted to be selectively coupled to the headboard and the footboard, wherein the side rails are selectively coupled to the headboard and the footboard by selective attachment points fixed to the side rails and to the headboard and footboard;
   wherein the footboard further comprises at least one retractable leg, the at least one retractable leg being housed in an interior portion of the at least two panel frames and selectively engaged in a predetermined position.

4. The modular bed frame of claim 3, wherein the at least one retractable leg is fixed in the predetermined position according to connection apertures in the footboard and fixed with at least one bolt.

5. A modular bed frame comprising:
   a headboard, the headboard being comprised of a first section and a second section and a hook plate, the first section having at least one hook and the second section having at least one hook aperture, the first section and second section being selectively coupled by mating the at least one hook and the at least one hook aperture;
   a footboard, the footboard being comprised of a first section and a second section and a hook plate, the first section having at least one hook and the second section having at least one hook aperture, the first section and second section being selectively coupled by mating the at least one hook and the at least one hook aperture; and
   at least two side rails, the at least two side rails having a frame hook at a first end and a second end, the at least two side rails being selectively coupled to the headboard and the footboard wherein the frame hook is engaged with the hook plate;
   wherein the headboard further comprises at least one retractable leg, the at least one retractable leg being housed in an interior portion of the first section and the second section.

6. The modular bed frame of claim 5, wherein the at least one retractable leg is selectively fixed in a predetermined position with at least one bolt.

7. A modular bed frame comprising:
   a headboard, the headboard being comprised of a first section and a second section and a hook plate, the first section having at least one hook and the second section having at least one hook aperture, the first section and second section being selectively coupled by mating the at least one hook and the at least one hook aperture;
   a footboard, the footboard being comprised of a first section and a second section and a hook plate, the first section having at least one hook and the second section having at least one hook aperture, the first section and second section being selectively coupled by mating the at least one hook and the at least one hook aperture; and
   at least two side rails, the at least two side rails having a frame hook at a first end and a second end, the at least two side rails being selectively coupled to the headboard and the footboard wherein the frame hook is engaged with the hook plate;
   wherein the footboard further comprises at least one retractable leg, the at least one retractable leg being housed in an interior portion of the first section and the second section.

8. The modular bed frame of claim 7, wherein the at least one retractable leg is selectively fixed in a predetermined position with at least one bolt.

9. A modular bed frame assembly comprising:
   at least two headboard panel frames, the at least two headboard panel frames having at least one panel hinge, at least one rotatable lock bar, and a side board connection aperture;
   at least two footboard panel frames, the at least two footboard panel frames having at least one panel hinge, at least one rotatable lock bar, and a side board connection aperture; and
   at least two side rail panel frames, the at least two side rail panel frames having at least one panel hinge, at least one rotatable lock bar, and at least one frame hook at a distal end.

10. The modular bed frame assembly of claim 9, further comprising at least one decorative panel.

11. The modular bed frame assembly of claim 9, wherein the modular bed frame assembly is manufactured from a material selected from the group consisting of wood, powder-coated steel, metal alloy, plastic, and PVC.

12. The modular bed frame assembly of claim 9, wherein the at least two headboard panel frames further comprise at least one retractable leg, the at least one retractable leg being housed in an interior portion of the at least two headboard panel frames.

13. The modular bed frame assembly of claim 9, wherein the at least two footboard panel frames further comprise at least one retractable leg, the at least one retractable leg being housed in an interior portion of the at least two headboard panel frames.

14. The modular bed frame assembly of claim 10, further comprising at least one frame rail hook plate coupled to the at least two headboard panel frames and the at least two footboard panel frames.

* * * * *